United States Patent [19]

Schuhmacher et al.

[11] 3,919,303

[45] Nov. 11, 1975

[54] MANUFACTURE OF 3-AMINOBENZOYLBENZOIC ACIDS

[75] Inventors: Alfred Schuhmacher, Ludwigshafen; Heinrich Hiller, Wachenheim; Joerg Redeker, Ludwigshafen, all of Germany

[73] Assignee: Badische Anilin- & Soda-Fabrik Aktiengesellschaft, Ludwigshafen (Rhine), Germany

[22] Filed: Mar. 20, 1974

[21] Appl. No.: 453,151

[30] Foreign Application Priority Data

Mar. 22, 1973 Germany.......................... 2314290

[52] U.S. Cl. ............................................. 260/517
[51] Int. Cl.² ...................................... C07C 101/78
[58] Field of Search.................................... 260/517

[56] References Cited
UNITED STATES PATENTS 3,726,831  4/1973  Acle et al. ......................... 260/517

OTHER PUBLICATIONS

Degering An Outline of Organic Nitrogen Compounds, (1945), p. 130.

*Primary Examiner*—James A. Patten

[57] ABSTRACT

Improvement in the process for the manufacture of 3-aminobenzoylbenzoic acids by catalytic reduction of the 3-nitro compounds, the improvement consisting in the reduction of the aqueous alkali metal salt solution of the 3-nitro compound in the presence of boric acid, its alkali metal or ammonium salts or mixtures thereof and in the presence of Raney nickel or nobel metal catalysts using hydrogen at atmospheric or slightly elevated pressure. The corresponding 3-aminobenzoylbenzoic acids are obtained in high yield.

10 Claims, No Drawings

MANUFACTURE OF 3-AMINOBENZOYLBENZOIC ACIDS

This invention relates to an improvement in the process for manufacturing 3-aminobenzoylbenzoic acids by catalytic reduction in aqueous medium.

Aminobenzoylbenzoic acids are manufactured industrially from the corresponding nitrobenzoylbenzoic acids either by catalytic hydrogenation in organic solvents or by reduction with iron filings in aqueous medium by the method proposed by Bechamp.

Although catalytic hydrogenation is simple to carry out, it suffers from the drawback that it must be carried out in highly flammable organic solvents. Another disadvantage is that undesirable byproducts are formed during reduction and these must be removed.

The Bechamp process provides pure products. However, this process is very expensive due to the need to handle large amounts of iron and to separate from the aqueous solution of the reduced product the voluminous iron hydroxide formed during reduction (see for example BIOS, Final Report No. 987, page 14; Ind. Eng. Chem., Vol. 21 (No. 12), page 1231 (1929); Houben-Weyl, Methoden der organischen Chemie, Vol. XI/1, page 394 (1957)).

Catalytic hydrogenation of aqueous alkali metal salt solutions of nitrobenzoylbenzoic acids with Raney nickel or noble metal catalysts is only possible when hydrogen pressures of more than 20 atmospheres are used. Under these conditions the nitro group is reduced but, where chlorine-substituted nitrobenzoylbenzoic acids are used, the halogen is simultaneously eliminated by reduction.

We have now found an improved process for the manufacture of 3-aminobenzoylbenzoic acids of the formula:

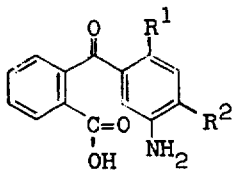

in which $R^1$ denotes hydrogen or chlorine and $R^2$ denotes hydrogen, chlorine, hydroxyl, amino or methyl, by catalytic reduction of the corresponding 3-nitro compound, in which the improvement consists in reducing the aqueous alkali metal salt solution of the 3-nitro compound with hydrogen at atmospheric or slightly elevated pressure in the presence of boric acid and/or salts of boric acid and in the presence of Raney nickel or noble metal catalysts.

The reduction with hydrogen is effected at atmospheric to slightly elevated hydrogen pressures. By slightly elevated pressures we mean pressures of less than 10 atmospheres.

In general, the process may be adequately carried out using from 0.2 to 2.5 moles of boric acid or salts thereof per mole of nitro compound. Advantageously, from 0.5 to 2 moles of boric acid or salts thereof are used per mole of nitro compound. Since high reducing rates are achieved in the presence of these amounts, it is particularly preferred to use from 0.5 to 2 moles of boric acid per mole of nitrobenzoylbenzoic acid. The use of larger amounts of boric acid has no added advantage, since reduction is no longer accelerated when use is made of more than 2.5 moles of boric acid per mole of nitro compound.

Suitable salts of boric acid are the alkali metal salts, particularly borax, and ammonium borate or mixtures thereof.

The process of the invention is conveniently carried out by adding boric acid or salts thereof and the catalyst to the aqueous solution of the alkali metal salt of the nitrobenzoylbenzoic acid and, after the air has been replaced by hydrogen, shaking or vigorously stirring the solution whilst hydrogen is passed into the gas space or through the solution. In general, the temperature rises to from 50° to 70°C to 80°C, depending on the size of the batch. Usually, the reduction is carried out at temperatures between room temperature and 90°C, preferably at the temperature of from 30° to 80°C which automatically occurs during reduction.

Suitable catalysts are, preferably, Raney nickel or palladium-on-charcoal, or also platinum-on-charcoal or platinum-on-barium sulfate. The amount of catalyst used is primarily dependent on the efficiency of the catalyst and is generally from 0.1 to 5% and preferably from 0.3 to 5%, by weight of the nitro compound.

Reduction is complete after from 0.5 to 7 hours depending on the catalyst used, the amount thereof and the nitro compound being reduced.

The hydrogenation mixture is worked up in conventional manner. After removal of the hydrogen, the catalyst is separated and the aminobenzoylbenzoic acid present in the solution is precipitated as the alkali metal salt by evaporation or is precipitated as the free carboxylic acid by adding acid, after which it is separated.

The isolated product has a purity equal to that of the product obtained by reduction by the Bechamp process.

The process of the invention is further illustrated by the following Examples, in which parts and percentages are by weight.

EXAMPLE 1

305 parts of 3'-nitro-4'-chlorobenzoyl-o-benzoic acid, 1,000 parts of water and 250 parts of borax are stirred in a hydrogenation apparatus. After the addition of 15 parts of Raney nickel, the air is replaced by hydrogen and hydrogen is passed through the batch. At a hydrogen pressure of 0.1 atmosphere gage, 67 parts by volume of hydrogen (STP) are absorbed in 5 hours, the temperature rising from 20° to 50°C. After isolation of the Raney nickel, the filtrate obtained contains 272 parts of 3'-amino-4'-chlorobenzoyl-o-benzoic acid (in the form of the sodium salt) in solution, this being equivalent to a yield of 99% of theory.

Depending on the end use of the aminochlorobenzoylbenzoic acid, it may be precipitated by the addition of dilute mineral acids and isolated as the free acid by filtration or it may be obtained in the form of sodium salt by evaporating the solution.

EXAMPLE 2

250 parts of 3'-nitro-4',6'-dichlorobenzoyl-o-benzoic acid, 650 parts of water and 240 parts of borax are stirred together in a hydrogenation apparatus, and hydrogen is passed therethrough after the addition of 4 parts of Raney nickel. At a hydrogen pressure of 2 atmospheres gage, hydrogen absorption commences at 20°C. The reaction mixture is cooled to maintain the temperature at 60°C. 49.5 parts by volume (STP) of hydrogen are absorbed in 3 hours. The Raney nickel is isolated to give a filtrate containing 216.5 parts of 3'-amino-4',6'-dichlorobenzoyl-o-benzoic acid (in the form of the sodium salt) in solution, equivalent to a yield of 95% of theory.

EXAMPLE 3

28.7 parts of 3'-nitro-4'-hydroxybenzoyl-o-benzoic acid are stirred in 250 parts of water and caused to pass into solution by the addition of 8 parts of caustic soda. After the addition of 6 parts of boric acid and 2 parts of 5% palladium-on-charcoal catalyst, hydrogen is passed through the solution.

At a pressure of about 0.1 atmosphere gage, 6.7 parts by volume of hydrogen are absorbed in 4 hours, the temperature of the reaction mixture rising from 20° to 40°C. After removal of the catalyst there is obtained a filtrate containing 25 parts of 3'-amino-4'-hydroxybenzoyl-o-benzoic acid (in the form of the disodium salt) in solution, equivalent to a yield of 97% of theory.

We claim:

1. In a process for the manufacture of 3-amino-o-benzoyl-o-benzoic acid of the formula:

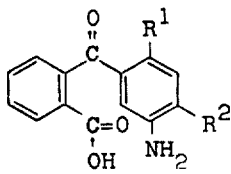

in which $R^1$ is hydrogen or chlorine and $R^2$ is hydrogen, chlorine, amino, methyl or hydroxyl, by the catalytic reduction of the corresponding 3-nitro compound, the improvement of reducing the aqueous alkali metal salt solution of the 3-nitrobenzoylbenzoic acid with hydrogen at atmospheric or slightly elevated pressures in the presence of boric acid, salts of boric acid or mixtures thereof and in the presence of Raney nickel, platinum or palladium.

2. A process as claimed in claim 1, wherein the reduction is carried out with hydrogen at atmospheric pressure to a pressure of 10 atmospheres.

3. A process as claimed in claim 1, wherein the hydrogenation is carried out in the presence of from at least 0.2 to 2.5 moles of boric acid, its alkali metal salts or ammonium salt or mixtures thereof, per mole of nitro compound.

4. A process as claimed in claim 1, wherein the hydrogenation is carried out in the presence of from 0.5 to 2 moles of boric acid, its alkali metal salts or ammonium salt or mixtures thereof, per mole of nitro compound.

5. A process as claimed in claim 1, wherein borax or ammonium borate is used as the boric acid derivative.

6. A process as claimed in claim 1, wherein the reduction is carried out at from room temperature to 90°C.

7. A process as claimed in claim 1, wherein the reduction is carried out at from 30° to 80°C.

8. A process as claimed in claim 1, wherein Raney nickel or palladium-on-charcoal is used as catalyst.

9. A process as claimed in claim 1, wherein the amount of catalyst used is from 0.1 to 5% by weight, based on the nitro compound.

10. A process as claimed in claim 1 wherein the reduction is carried out at about atmospheric pressure up to 10 atm. and from about room temperature to 90°C. in the presence of from about 0.2 to 2.5 moles of boric acid, its alkali metal or ammonium salts or mixtures thereof, per mole of nitro compound.

* * * * *